(12) United States Patent
Hassan, III (10) Patent No.: US 10,584,609 B2
(45) Date of Patent: Mar. 10, 2020

(54) GAS TURBINE ENGINE FRAME ALIGNMENT TOOL

(71) Applicant: Rolls-Royce Corporation, Indianapolis, IN (US)

(72) Inventor: Daniel J. Hassan, III, Noblesville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 409 days.

(21) Appl. No.: 15/584,902

(22) Filed: May 2, 2017

(65) Prior Publication Data

US 2017/0370245 A1  Dec. 28, 2017

Related U.S. Application Data

(60) Provisional application No. 62/353,315, filed on Jun. 22, 2016.

(51) Int. Cl.
| | | |
|---|---|---|
| *F01D 21/00* | (2006.01) | |
| *G01B 5/00* | (2006.01) | |
| *F02C 3/04* | (2006.01) | |
| *F02C 7/20* | (2006.01) | |
| *G01B 11/27* | (2006.01) | |
| *F01D 25/24* | (2006.01) | |

(52) U.S. Cl.
CPC .............. *F01D 21/003* (2013.01); *F02C 3/04* (2013.01); *F02C 7/20* (2013.01); *G01B 5/0004* (2013.01); *G01B 11/27* (2013.01); *F01D 25/24* (2013.01); *F05D 2220/32* (2013.01); *F05D 2230/64* (2013.01); *F05D 2230/644* (2013.01); *F05D 2240/35* (2013.01); *F05D 2240/90* (2013.01); *F05D 2260/80* (2013.01)

(58) Field of Classification Search
CPC .............. F01D 21/003; F05D 2230/64; F05D 2230/644; F05D 2260/83
See application file for complete search history.

(56) References Cited

U.S. PATENT DOCUMENTS

| | | |
|---|---|---|
| 5,576,826 A | 11/1996 | Hamar |
| 8,142,150 B2 | 3/2012 | Frick et al. |
| 8,177,483 B2 | 5/2012 | McCallum |
| 8,689,455 B2 | 4/2014 | Smith et al. |
| 8,834,113 B2 | 9/2014 | Schaus et al. |
| 2013/0219733 A1 | 8/2013 | Smith et al. |
| 2015/0092039 A1 | 4/2015 | Ruhge et al. |
| 2016/0369655 A1* | 12/2016 | Scott ............... F01D 25/243 |
| 2017/0191381 A1* | 7/2017 | Baba ............... F01D 25/28 |
| 2017/0321563 A1* | 11/2017 | LeBlanc ............ F01D 25/285 |

OTHER PUBLICATIONS

Extended European Search Report, European Application No. 17175184.5-1610, dated Nov. 2, 2017, 5 pages.
European Official Action dated Sep. 13, 2018 and issued in connection with EP Appln. No. 17175184.5, 4 pgs.

* cited by examiner

*Primary Examiner* — Scott J Walthour
(74) *Attorney, Agent, or Firm* — Barnes & Thornburg LLP (57) ABSTRACT

Devices, systems, and methods for alignment of gas turbine engine components including frame components.

18 Claims, 6 Drawing Sheets

GAS TURBINE ENGINE FRAME ALIGNMENT TOOL

CROSS-REFERENCE TO RELATED APPLICATIONS

This application claims priority to and the benefit of filing of U.S. Provisional Application No. 62/353,315, filed Jun. 22, 2016, the contents of which are incorporated herein by reference in their entireties, and including but without limitation, at least those portions directed to alignment for gas turbine engines.

BACKGROUND

The present disclosure relates generally to gas turbine engines, and more specifically to tools used in conjunction with gas turbine engine components.

Gas turbine engines are used to power aircraft, watercraft, power generators, and the like. Gas turbine engines typically include a frame supporting an engine core having a compressor, a combustor, and a turbine. The compressor compresses air drawn into the engine and delivers high pressure air to the combustor. In the combustor, fuel is mixed with the high pressure air and is ignited. Exhaust products of the combustion reaction in the combustor are directed into the turbine where work is extracted to drive the compressor and, sometimes, an output shaft, fan, or propeller. Alignment of various engine components is important to proper engine build, function, and lifetime.

SUMMARY

The present disclosure may comprise one or more of the following features and combinations thereof.

According to an aspect of the present disclosure, a gas turbine engine may include an engine core that extends along a rotating axis and an engine support structure including a forward frame and an aft frame arranged near respective forward and aft ends of the engine. The engine core includes a compressor, a combustor, and a turbine, an engine support structure. Each of the forward frame and the aft frame includes a mount for attachment of the engine frame to a base feature. The mounts of the forward frame and the aft frame are arranged in spaced apart relation to each other along the direction of the rotating axis.

In some embodiments, an alignment tool for measuring an amount of angular misalignment between the forward frame and the aft frame is provided. The alignment tool may include a projection tool attached to the mount of one of the forward frame and the aft frame and a display tool attached to the mount of the other of the forward frame and the aft frame. The projection tool may include a body arranged between opposite ends and may include a position projector mounted to the body and configured to project a marker onto the display tool to indicate a relative angular position of the projection tool.

In some embodiments, the position projector of the projection tool may include a laser alignment tool. The laser alignment tool may be configured to project a visual marker onto the display tool.

In some embodiments, the display tool may include a marker window for receiving the visual marker as projected by the indicator tool to indicate an angular position of the laser alignment tool. In some embodiments, the display tool may include a base attached to the mount of the other of the forward frame and the aft frame, a riser that extends radially from the base, and an adjustable slide received by the riser for sliding movement between a first position and a second position to align the marker window with the visual marker.

In some embodiments, the display tool may include an adjustment device including a rod coupled to the adjustable slide and a position wheel that is pinned for rotation to the riser of the display tool by the rod. The adjustment wheel may be rotatable about the rod to adjust the position of the adjustable slide.

In some embodiments, the rod may include exterior threads engaged with interior threads of the position wheel. Rotation of the adjustment wheel in a first direction threads the rod through the adjustment wheel in a first rotating direction and rotation of the adjustment wheel in a second rotating direction threads the rod through the adjustment wheel in a second direction.

In some embodiments, the display tool includes an indicator having an indicator window corresponding to an acceptable angular range of misalignment between the forward frame and the aft frame and a position indicator demarking the position of the adjustable slide relative to the measurement window. The indicator window may be disposed on one of the frame and the adjustable slide and the position indicator is disposed on the other of the frame and the adjustable slide.

In some embodiments, the projection tool may include at least one mounting point coupled to the mount of the one of the forward frame and the aft frame. In some embodiments, the display tool may include at least one receiver configured to receive the marker from the projection tool and to generate a signal indicating the position of the projection tool based on the marker. In some embodiments, the mounts of the forward and aft frames are configured to mount the engine to an aircraft.

According to another aspect of the present disclosure, a gas turbine engine may include an engine body including an engine core that extends along a rotating axis and an engine support structure. The engine core includes a compressor, a combustor, and a turbine. The engine support structure includes a forward frame and an aft frame arranged near respective forward and aft ends of the engine. Each of the forward frame and aft frame includes a mount for attachment of the engine frame to a base feature and the mounts of the forward frame and the aft frame are arranged in spaced apart relation to each other along the direction of the rotating axis. A projection tool may be attached to the mount of one of the forward frame and the aft frame for projecting a marker to indicate position. A display tool may be provided and may include a base attached to the mount of the other of the forward frame and the aft frame, a riser that extends from the base, and an adjustable slide having a marker window for receiving the marker of the projection tool. The adjustable slide may be slidably received by the riser for movement between a first position and a second position to determine the angular alignment between the forward and the aft frame.

In some embodiments, the display tool may include an adjustment device including a rod coupled to the adjustable slide and a position wheel that is pinned for rotation to the frame of the display tool by the rod, the adjustment wheel being rotatable about the rod to adjust the position of the adjustable slide.

In some embodiments, the rod may include exterior threads engaged with interior threads of the position wheel. Rotation of the adjustment wheel in a first direction threads the rod through the adjustment wheel in a first direction and rotation of the adjustment wheel in a second direction threads the rod through the adjustment wheel in a second direction.

In some embodiments, the projection tool may include a body arranged between opposite ends and having at least one mounting point. The projection tool may include a position projector mounted to the body and configured to project a marker to indicate a relative angular position of the projection tool. In some embodiments, the base of the display tool may include a number of holes penetrating therethrough to receive fasteners for connection to the mount of the other of the forward frame and the aft frame.

In some embodiments, the base of the display tool may include a riser hole penetrating therethrough to receive a bottom portion of the riser of the display device.

In some embodiments, the marker window of the display tool may include at least one receiver. The receiver may be configured to receive the marker from the projection tool and to generate a signal indicating the position of the projection tool based on the marker. In some embodiments, the mounts of the forward and aft frames may be configured to mount the engine to an aircraft.

According to another aspect of the present disclosure, an alignment system for measuring an amount of angular misalignment between a forward frame and an aft frame of a gas turbine engine may include a projection tool that includes a body extending between opposite ends and having at least one mounting point and a display tool that includes a base, a frame that extends from the base, and an adjustable slide received by the frame for sliding movement between a first position and a second position. The projection tool may include a position projector mounted to the body and configured to project a marker to indicate a relative angular position of the projection tool. The display tool may include a marker window disposed the adjustable slide for receiving projection of the marker and an indicator having an indicator window corresponding to an acceptable range of misalignment and a position indicator demarking the position of the adjustable slide relative to the measurement window, and an adjustment device including a position wheel and an adjustment rod received by the position wheel and coupled to the display tool to move the adjustable slide between the first and second positions. Upon alignment of the marker of the projection tool and the marker window of the display tool and alignment of the position indicator with the indicator window, the relative positions of the projection tool and the display tool are within the acceptable range of misalignment.

According to another aspect of the disclosure, an alignment tool for measuring an amount of angular misalignment between an forward frame and an aft frame of a gas turbine engine along a rotational axis, each of the forward frame and an aft frame having a mount may include a display tool attached to the mount of the one of the forward frame and the aft frame and arranged to receive a projection of a marker for determining relative position; and a projection tool configured for attachment to the mount of the other of the forward frame and the aft frame of the gas turbine engine, the projection tool including a body and a position projector mounted to the body and configured to project the marker to indicate a relative angular position of the projection tool, the body including a number of mounting points adapted for connection to the mount of the other of the forward frame and the aft frame, the mounting points each having a mount surface, and a projector surface arranged to receive the projector, wherein the projector surface is arranged with a predetermined axial offset from each of the mounting surfaces.

In some embodiments, each of the mounting surfaces may lie in the same plane. In some embodiments, the body may include a projector support for receiving the position projector selectively mounted thereto, the projector support mounted to the projector surface. In some embodiments, the projector surface may be parallel to at least one of the mounting surfaces. In some embodiments, the projector surface may be parallel to both of the mounting surfaces.

In some embodiments, the mounting surfaces may be recessed surfaces formed within the body. In some embodiments, the mounting surfaces may each lie in a plane that is orthogonal to the rotational axis of the gas turbine engine.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

In gas turbine engines, the amount of angular misalignment should be appropriately controlled during assembly and mounting of the engine for use. Improper alignment between engine components, for example, frame components, can lead to improper operation and/or premature deterioration of the engine. Gauging angular misalign during the build process can assist in reducing the amount of angular misalignment and/or identify misalignment beyond acceptable and/or desirable tolerance.

Figure 1:
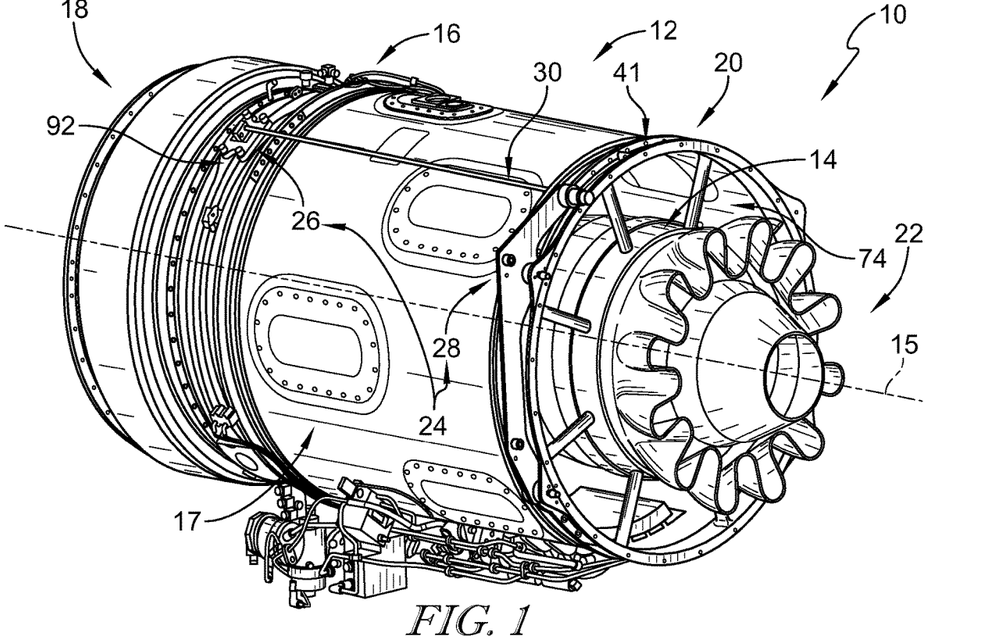
FIG. 1 is a perspective view of a gas turbine engine that extends along an axis between a forward end (left side) and aft end (right side) and including an engine support structure having a front (forward) frame and a rear (aft) frame and including an alignment tool having a display tool coupled with the front frame and a projection tool coupled with the rear frame for projecting a marker onto the display tool to gauge the amount of angular misalignment between the forward and rear frames.

An illustrative gas turbine engine 10 includes an engine support structure 12 and an engine core 14 positioned within the engine support structure 12 as shown in FIG. 1. The engine support structure 12 illustratively includes a forward frame 16 that is positioned proximate to a forward end 18 of the engine and an aft frame 20 positioned proximate to an aft end 22 of the engine 10. The engine 10 illustratively includes an alignment tool 24 for gauging the relative angular alignment between the forward frame 16 and the aft frame 20.

The alignment tool 24 illustratively includes a display tool 26 and a projection tool 28, each coupled to one of the forward and aft frames 16, 20 as shown in FIG. 1. In the illustrative embodiment, the display tool 26 is coupled to the forward frame 16 and receives a marker 30 projected by the projection tool 28 that is coupled to the aft frame 20. The projection of the marker 30 onto the display tool 26 permits a user to gauge the amount of angular misalignment d between the forward and aft frames 16, 20.

The engine 10 illustratively extends along an axis 15 as a central axis as shown in FIG. 1. In the illustrative embodiment, the forward and aft frames 16, 20 are illustratively centered around the axis 15 and are angularly aligned relative to each other within a predetermined tolerance α. The engine 10 includes an outer bypass duct 17 that extends along the axis 15 and connects with each of the forward frame 16 and the aft frame 20 by flanged connections as shown in FIG. 1. A user can determine whether the amount of angular misalignment d between the forward and aft frames 16, 20 is within the predetermined tolerance α by observing the marker 30 as projected onto the display tool 26 by the projection tool 28.

Figure 2:
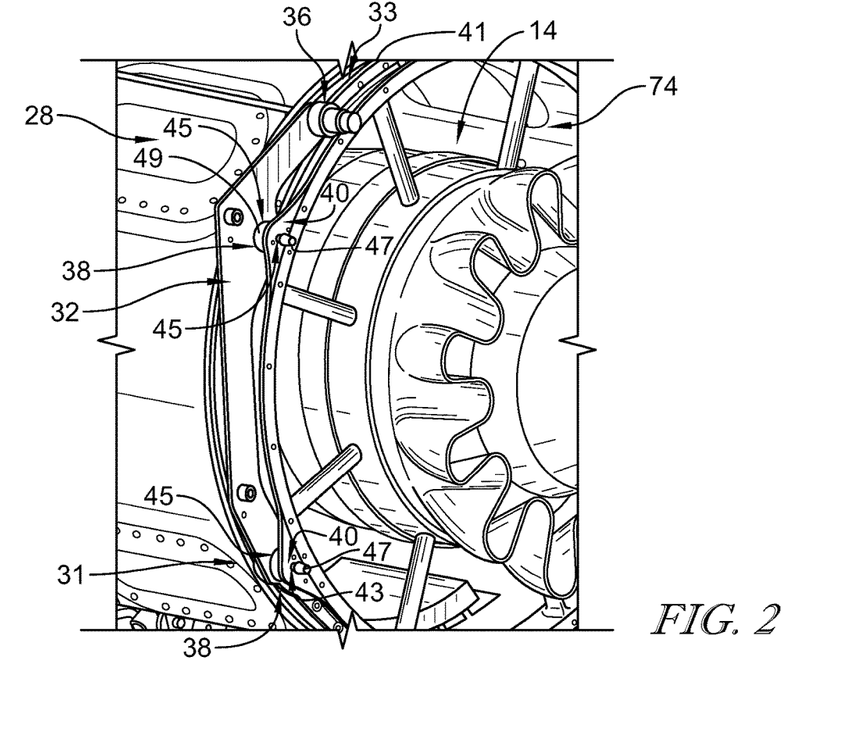
FIG. 2 is a closer perspective view of the aft frame of the gas turbine engine of FIG. 1 showing that the projection tool includes a body and a laser alignment tool attached to the body for projecting a visual marker onto the display tool.
Figure 3:
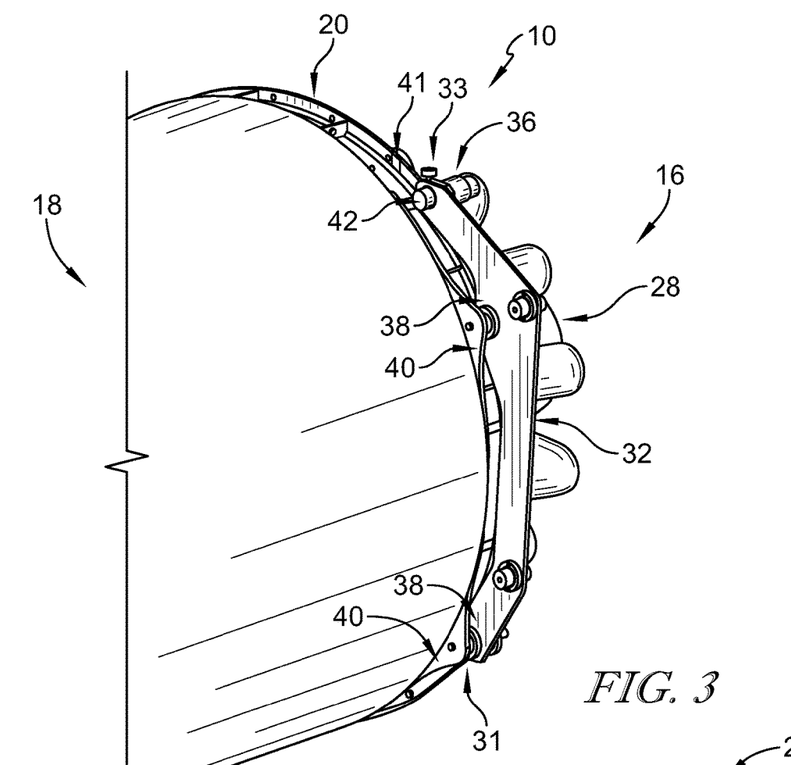
FIG. 3 is a perspective view from of the rear (aft) frame of FIG. 2 the forward side showing that the projection tool includes at least one mounting point coupled to a mount of the rear (aft) frame.

In the illustrative embodiment as shown in FIGS. 2 and 3, the projection tool 28 includes a body 32 that extends between opposite ends 31, 33 and a projector 36 coupled to the body 32 proximate to the end 33. The body 32 of the projection tool 28 includes a number of attachment points 38 for connection to mount 40 of the aft frame 20. The body 32 is illustratively rigid and configured for fixed attachment to the frame 12 to maintain a fixed position of the projector 36 relative to the attachment points 38. The body 32 is illustratively embodied to be formed of a metal plate, but in some embodiments may be formed of any one or more suitable materials. As best shown in FIG. 3, the projector 36 illustratively includes a projection end 42 that faces towards the forward end 18 of the engine 10 to project the marker 30 towards the display tool 26 on the forward frame 16.

Figure 4:
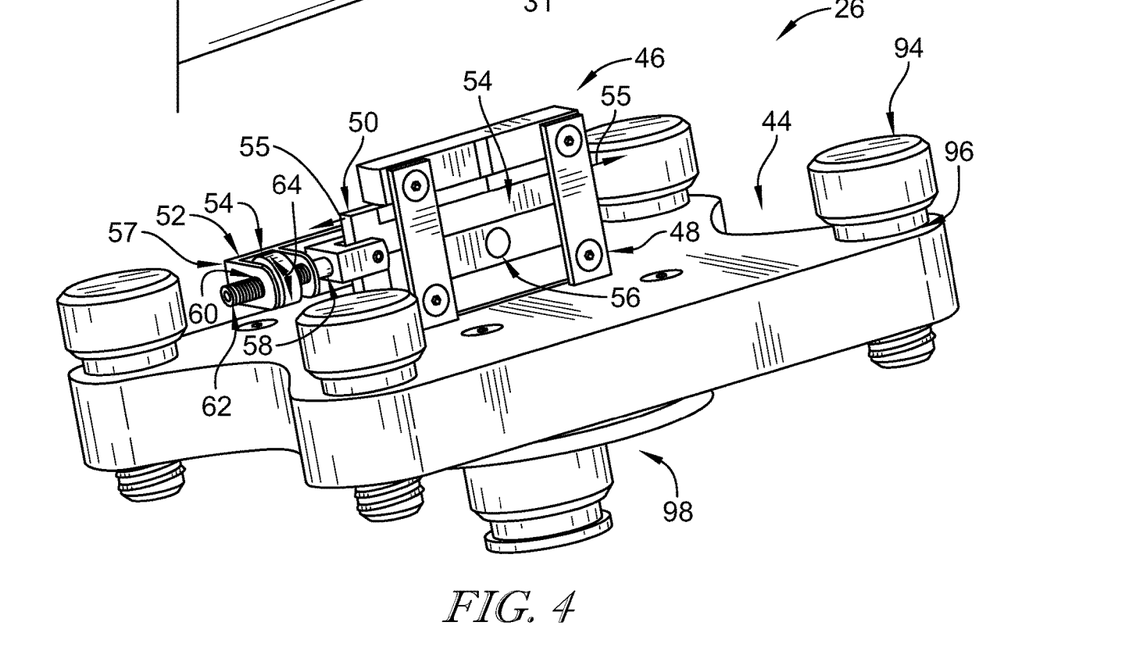
FIG. 4 is a perspective view of the display tool of the gas turbine of FIG. 1 showing that the display tool includes a base and a riser extending from the base and receiving a slider for gauging the amount of angular misalignment between the front and rear (forward and aft) frames.

As shown in the illustrative embodiment of FIG. 4, the display tool 26 includes a base 44 and a riser 46 extending from the base 44. The riser 46 includes a framework 48 coupled to the base 44 and a slider 50 slidably received by the framework 48 and operable between end positions relative to the framework 48 as indicated by arrows 55. The display tool 26 illustratively includes an adjustment device 52 connected to the slider 50 to selectively adjust the slider 50 between the end positions.

The slider 50 illustratively includes a window 56 disposed on a side 54 thereof for gauging angular misalignment d between the forward and aft frames 16, 20 as shown in FIG. 4. The side 54 is illustratively arranged to face the aft end 22 of the engine 10 (as shown in FIG. 1). As explained in detail below, when the projection tool 28 projects the marker 30 onto the side 54 of the display tool 26 such that the marker 30 is within the window 56, the alignment tool 24 is deemed to be in contact and the amount of misalignment d can be gauged. If the marker 30 as projected onto the slider 50 is not within the window 56, a user can illustratively operate the adjustment device 52 to move the slider 50 between the end positions such that the marker 30 is within the window to place the alignment tool 24 in contact to permit the amount of misalignment d to be gauged.

Figure 5:
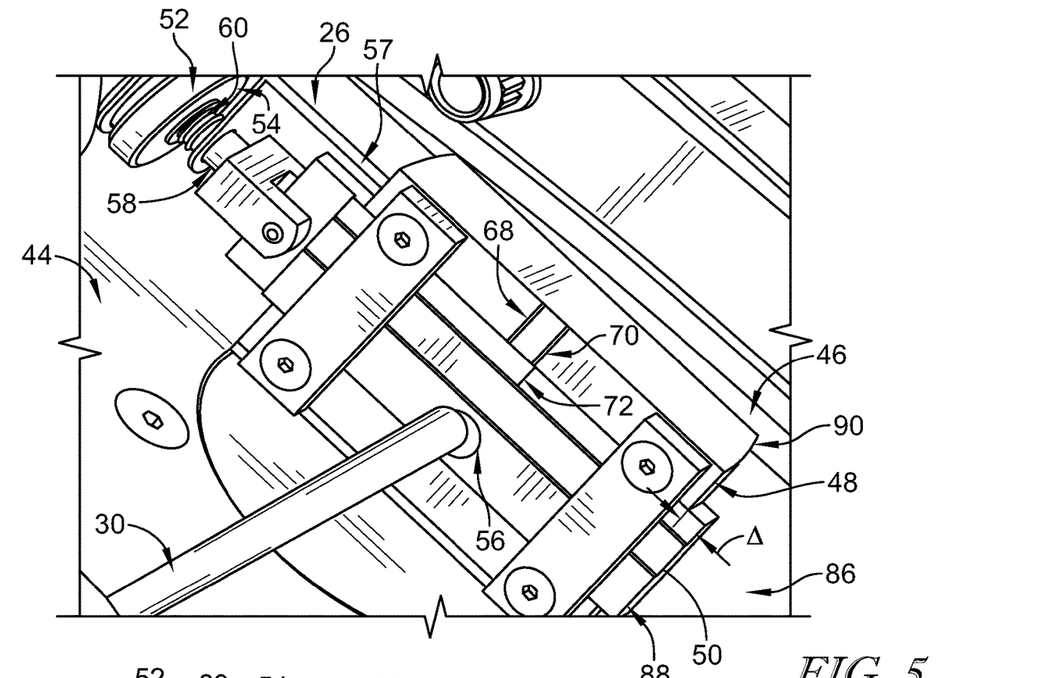
FIG. 5 is a perspective view of the display tool of FIG. 4 coupled to the front (forward) frame and receiving projection of a marker outside of a marker window from the projection tool.
Figure 6:
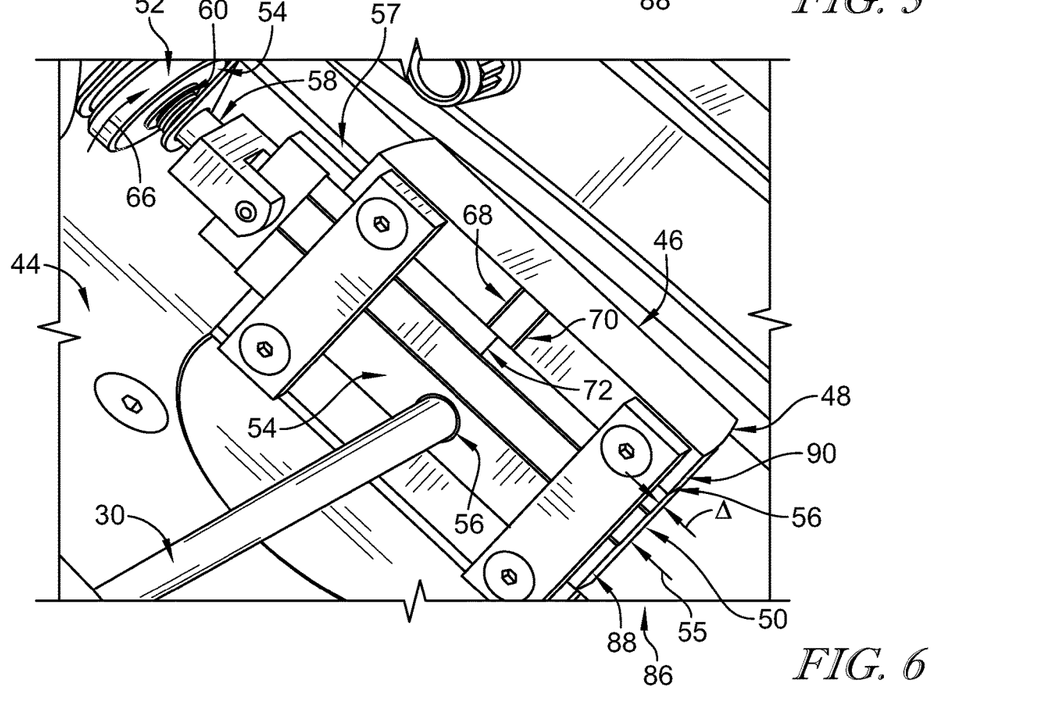
FIG. 6 is perspective view of the display tool of FIGS. 4 and 5 showing that an adjustment wheel of the display tool has been operated to move the slider such that the marker projected by the projection tool is received within the marker window to indicate the amount of angular misalignment between the front and rear (forward and aft) frames.

The adjustment device 52 illustratively includes an adjustment wheel 54 that is rotationally pinned to an arm 57 of the framework 48 and a rod 58 threaded through the adjustment wheel 54 and pinned to the slider 50 as shown in FIGS. 4-6. As best shown in FIG. 5, the adjustment wheel 54 illustratively includes a hole 60 defined by an interior surface having interior threads forming a threaded connection with exterior threads 62 of the rod 58. As the adjustment wheel 54 rotates about the rod 58 in a first direction, the threaded connection causes the rod 58 to move away from the riser 46 moving the slider to the left (in the orientation as shown in FIG. 4). As the adjustment wheel 54 rotates about the rod 58 in a second direction opposite the first direction, the threaded connection causes the rod 58 to move towards the riser 46 and moving the slider 50 to the right (in the orientation as shown in FIG. 4). The threaded connection can permit fine adjustment of the position of the slider 50 through the inclined planes of the interior and exterior 62 threads.

As shown in FIG. 5, the marker 30 is illustratively embodied as a visual marker, namely a low energy laser, that is projected by the projection tool 28 onto the slider 50 of the display tool 26. FIG. 5 shows the marker 30 projecting onto the slider 50 but remaining outside of the window 56. As shown in FIG. 6, a user can operate the adjustment device to move the slider 50 to place the alignment tool 24 in contact.

In FIG. 6, a user illustratively rotates the adjustment wheel 54 in the direction indicated by arrow 66 to move the slider to the left (in the orientation shown in FIG. 6), as indicated by arrow 55, until the marker 30 is within the window 56 to place the alignment tool 24 in contact. Once in contact, the user can gauge the amount of misalignment d between the forward and aft frames 16, 20.

In the illustrative embodiment, the user can gauge the amount of misalignment d according to a gauge 68 as shown in FIGS. 5 and 6. The gauge 68 illustratively includes a tolerance band 70 disposed on the framework 48 on a side complimentary to the side 54 of the slider 50 and an indicator 72 disposed on the side 54 of the slider 50. The tolerance band 70 illustratively comprises a pair of lines that together define a predetermined allowable misalignment tolerance between the forward and aft frames 16, 20. In the illustrative embodiment, the tolerance band 70 defines a predetermined allowable misalignment tolerance α between the forward and aft frames 16, 20 to be between +/−0.26 degrees, and preferably between +/−0.13 degrees. In some embodiments, the allowable misalignment tolerance α may be application specific and/or engine specific. The indicator 72 provides a visual indicator of the projection tool 28 as indicated by the display tool 26 while the alignment tool 24 is in contact.

While the alignment tool 24 is in contact, if the indicator 72 is between the lines of the tolerance band 70, it can be determined that the angular misalignment d between the forward and aft frames 16, 20 is acceptable as suggested in FIG. 6. While the alignment tool 24 is in contact, if the indicator 72 is outside of the lines of the tolerance band 70, it can be determined that the angular misalignment d between the forward and aft frames 16, 20 is unacceptable and adjustment of the relative angular positions of the frames 16, 20 is required.

Referring to FIGS. 5 and 6, the display tool 26 illustratively includes a measurement end 86 including an end 88 of the slider 50 and an end 90 of the framework 48. A measurement of the offset Δ between the end 88 and the end 90 can be taken by a measuring tool, such as a caliper, and can be converted to the angular misalignment d between the forward and aft frames 16, 20, for example, by a conversion of 0.004 inches=0.01 degrees. In some embodiments, the angular misalignment d may be gauged by directly reading the marker 30 as projected onto a ruler as indicated on the display tool 26. In some embodiments, the alignment tool may include a camera, FARO arm, and/or other visual-based alignment device. In some embodiments, the display tool 26 may comprise a receiver and the projection tool 28 may project a signal indicating the angular position of the projection tool 28 (and therefore, the position of the frame 16, 20 to which it is attached) for reception by the receiver. The engine 10 may comprise a computing device in communication with the receiver and configured to determine the angular misalignment between the forward and aft frames 16, 20 based on the signal, for example, by executing instructions stored within a memory device to determine the relative angular misalignment based on the signal. In some embodiments, the marker 30 may include a transmission using either or both of electromagnetic signals within the visual spectrum or outside the visual spectrum.

Figure 7:
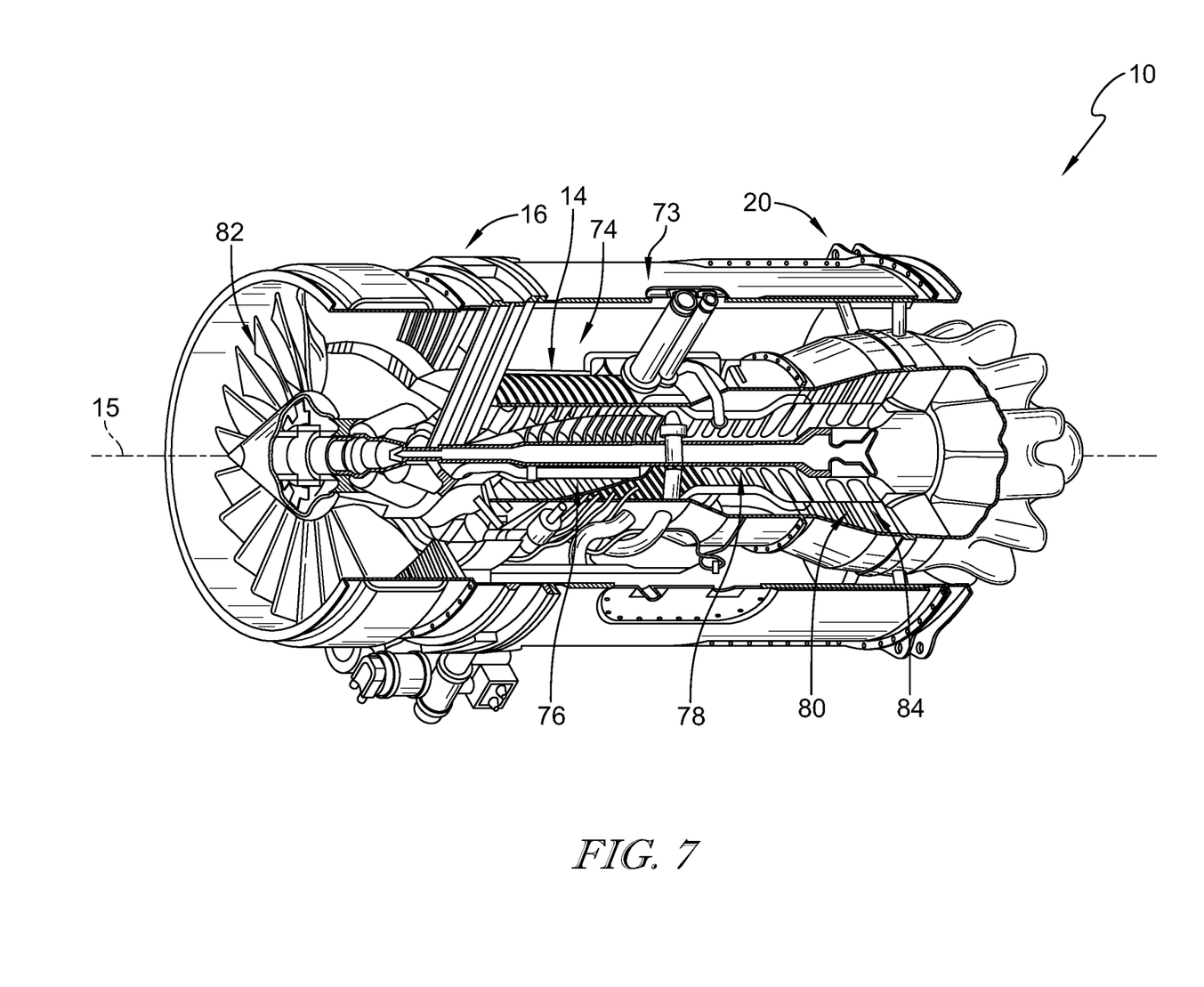
FIG. 7 is perspective view of the gas turbine engine of FIG. 1 having a portion cut away to reveal an engine core positioned within the engine support structure.

Referring now to FIG. 7, the engine 10 extends along an axis 15 between the forward and aft ends 18, 22. The frame 12 illustratively includes a casing 73 disposed between the forward and aft frames 16, 20. The frame 12 illustratively defines a cavity 74 for receiving the engine core 14. The core 14 includes a compressor 76, a combustor 78, and a turbine 80 as shown in FIG. 7. The engine 10 illustratively includes fan 82 that draws air into the compressor 76. The compressor 76 compresses and delivers the air to the combustor 78. The combustor 78 mixes fuel with the compressed air from the compressor 76 and combusts the mixture. The hot, high-pressure exhaust products of the combustion reaction in the combustor 78 are directed into the turbine 80 to cause turbine blades 84 to rotate about the axis 15 to drive fan 82 and compressor 76.

Returning to the FIGS. 1 and 2, in the illustrative embodiment, the mount 40 of the aft frame 20 is illustratively embodied as a number of flanges adapted for attachment to a base feature. The mount 40 is illustratively arranged to position the projection tool 28 along a centerline 41 of the aft frame 20 along the axis 15. The mount 40 illustratively includes fastener holes 43 and the attachment points 38 of the projection tool 28 illustratively include fastener holes 45. Bushings 49 are illustratively disposed between the mount 40 and the attachment points 38 and receive the fasteners 47 therethrough. The fasteners holes 43, 45 are illustratively arranged for receiving fasteners 47 therethrough to attach the projection tool 28 to the aft frame 20.

As shown in FIG. 1, the display tool 26 is illustratively attached to a mount 92 of the forward frame 16. The mount 92 is illustratively arranged at the center line of the aft frame 20 that is orthogonal to the axis 15. As shown in FIG. 3, the display tool 26 receives fasteners 94 for attachment to the forward frame 16. In the illustrative embodiment, the base 44 of the display tool 26 includes fastener holes 96 penetrating therethrough for receiving the fasteners 94. The fasteners 94 illustratively extend through the fastener holes 96 to connect with the mount 92 of the forward frame 16. The framework 48 of the display tool 26 illustratively includes a root 98 that projects from the base 44 for reception within a cavity of the mount 92 when the base 44 is attached to the mount 92.

In the illustrative embodiment, the mounts 40, 86 are adapted for attachment to an aircraft, and particularly, for attachment to support points of the wing of the aircraft as base features for on-wing installation. In some embodiments, the mounts 40, 86 may be adapted for attachment to any number of base features such as base supports points for electric power generation; aerospace, watercraft, and/or land vehicle propulsion; and/or any other stationary or mobile application and/or combinations thereof. In the illustrative embodiment, the fasteners 47, 94 are embodied as threaded bolts and are similar to the threaded bolts used to attach the mounts 40, 86 to the aircraft. In some embodiments, the fasteners 47, 94 may be the same fasteners 47, 94 used to attach the mounts 40, 86 to the base feature. Thus, in the illustrative embodiment, the attachment of the alignment tool 24 to the frame 12 utilizes the same mounts 40, 86 and the same and/or similar fasteners 47, 94 for mounting the alignment tool 24 as for attaching the engine 10 to the aircraft.

The present disclosure includes devices, systems, and methods related to development of a gage and/or tool to measure the angular positioning or "twist" of a front frame to rear frame of a turbine engine, for example, the AE3007C, adapted for use, for example, on an aircraft. The allowable angular twist may be +/−0.26 degrees and the desired angular twist may be +/−0.13 degrees. The distance between the desired measurement points on the front and rear frame may be 57 inches, but may be greater or less than 57 inches. Thus, the angular twist +/−0.13 degrees between front and rear frames over a distance of about 57" on a gas turbine engine assembly can be reliably measured and/or gauged.

The present disclosure includes devices, systems, and methods for conducting engine assembly or overhaul, for example, on the AE3007C front frame to rear mounting frame angular clocking or "twist" which may potentially be out-of-tolerance. By developing a gage and/or tool that can be used to measure the angular positioning or "twist" of the AE3007C front frame to rear mounting frame proper positioning can be obtained for the AE3007C front frame to rear mounting frame during assembly or overhaul. Proper alignment may aid installation on the aircraft, reduce vibration during engine operation, avoid changes to engine component design that would be needed to ensure this alignment during engine build.

Off-the-shelf components including a laser tracker, camera vision system and a FARO arm can be expensive and may lack certain capability, have extensive setup time, and/or do not check the desired alignment in a functional manner. The present disclosure includes reference to the on-wing installation hardware and locating points to provide the best real-world results and may reduce set up time, for example, to less than 5 minutes.

The devices, systems, and methods of the present disclosure include use during final engine assembly and/or while the engine is on-wing. In some embodiments, the rear ring of the tool locates on two (of the possible four) rear mount bushings. In some embodiments, a commercial-off-the-shelf (COTS) precision laser module is inserted into the tool to provide the source emitting light and two pins are used to locate the rear ring relative to the rear frame. The pins simulate the hardware used during engine installation on-wing.

The present disclosure includes a process of measuring and implementing alignment of the engine support structure 12. In the illustrative embodiment, the process illustratively includes mounting the alignment tool 24 to its respective mounts 40, 86, adjusting the adjustment device 52 to place the alignment tool 24 in contact, and gauging the amount of misalignment d between the forward and aft frames 16, 20.

In some embodiments, gauging may include measuring the amount of misalignment d between the forward and aft frames 16, 20, for example, using a caliper and/or a scale of the display tool 26. In some embodiments, the process may further include determining that the amount of misalignment d is unacceptable. In some embodiments, the process may include adjusting the angular position of at least one of the forward and aft frames in response to determination that the amount of misalignment d is unacceptable, and re-adjusting the adjustment device 52 to place the alignment tool 24 in contact, and re-gauging the amount of misalignment d between the forward and aft frames 16, 20.

In the illustrative embodiment, build process illustratively includes, at various predetermined intervals during a build process for the engine, performing each of: mounting the alignment tool 24 to its respective mounts 40, 86, adjusting the adjustment device 52 to place the alignment tool 24 in contact, and gauging the amount of misalignment d between the forward and aft frames 16, 20. In some embodiments, the predetermined intervals may include at least one of after installation of the turbine, after installation of the combustor, after installation of the compressor, after installation of any other gas turbine engine components, and/or after connecting the mounts to a base feature.

In some embodiments, the front tool piece can be used as the laser target and angular measurement piece. In some embodiments, the tool can mount on one of the possible four front frame mounts. In some embodiments, the tool can locate on the centerline of the front frame mount and secure with hardware similar to that used during engine installation on-wing. In some embodiments, the laser source from the rear frame tool may be projected to the front frame tool.

In some embodiments, the slide mechanism on the front frame tool can be moved horizontally to align the laser beam with the etched zero marking on the front frame tool slide via a thumb wheel. In some embodiments, the front frame slide zero marking can then be compared to the outer housing limit window to measure the engine angular alignment. In some embodiments, this provides an attribute (go/no-go) measurement. In some embodiments, the tool may be designed to obtain variable data. In some embodiments, a visual measurement scale can be included on the front frame tool slide to indicated slide travel versus engine angular alignment. In some embodiments, the distance between the outer edge of the slide and the outer frame can be measured so the conversion can take place.

The present disclosure includes devices, systems, and methods for any type of gas turbine engine that uses core assemblies that may benefit from alignment. Core pieces can be aligned to the front frame individually during build. The tool can measure alignment of any external component relative to an engine feature. Such piecework alignment can reduce tool engine misalignment issues and tolerance buildup.

Referring to FIGS. 8-11, another illustrative embodiment is shown of a projection tool 128 adapted for use with the gas turbine engine 10 to project a marker 30 onto the display tool 26 to gauge the amount of angular misalignment d between the forward and aft frames 16, 20. The projection tool 128 is similar to the projection tool 28 and the disclosure of the projection tool 28 generally applies to the projection tool 128, except in instances of conflict with the specific disclosure of the projection tool 128 herein.

Figure 8:
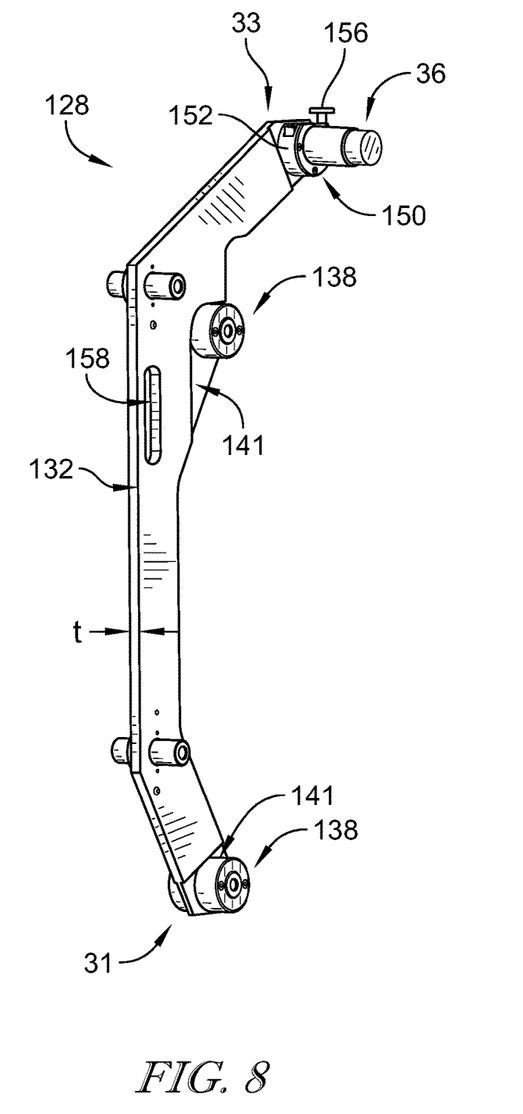
FIG. 8 is a perspective view of another embodiment of a projection tool of the an alignment tool adapted for use in the gas turbine engine of FIG. 1 for projecting a marker onto the display tool.

In the illustrative embodiment as shown in FIG. 8, the projection tool 128 includes a body 132 extending between opposite ends 31, 33. The projection tool 128 illustratively includes attachment points 138 for connection to the mount 40. The attachment points 138 collectively secure the body 132 with the mount 40 to position the projector 36 for projecting the marker 30 parallel to the axis 15 of the gas turbine engine 10 for display on the display tool 26.

Figure 9:
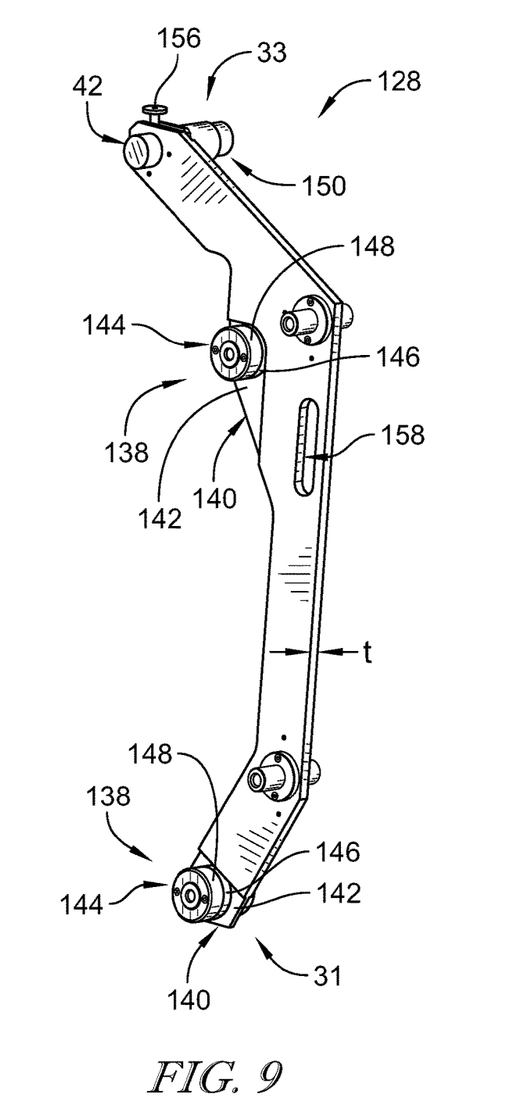
FIG. 9 is another perspective view of the projection tool of FIG. 8 showing that the attachment points include pockets defined in a body of the projection tool.

As shown in FIG. 9, the attachment points 138 illustratively include pockets 140 embodied as recesses formed in the body 132 of the projection tool 128. The pockets 140 each illustratively include a surface 142 formed for precision fit with the mount 40 to position the end 33 of the body 132 in alignment (in the same or parallel plane) with the centerline 41 of the aft frame 20 along the axis 15. The surfaces 142 each illustratively define a platform for mounting a bushing 144. The bushing 144 illustratively includes a bushing plate 146 and a bushing pad 148, the respective bushing plate 146 engaging directly against the surface 142 and the bushing pad 148 engaging the bushing plate 146 and the mount 40 as suggested in FIG. 9. The pockets 140 illustratively provide a dimensional platform for accurately securing the projection tool 128 with the frame 20, and consequently, accurately positioning the projector 36.

Figure 10:
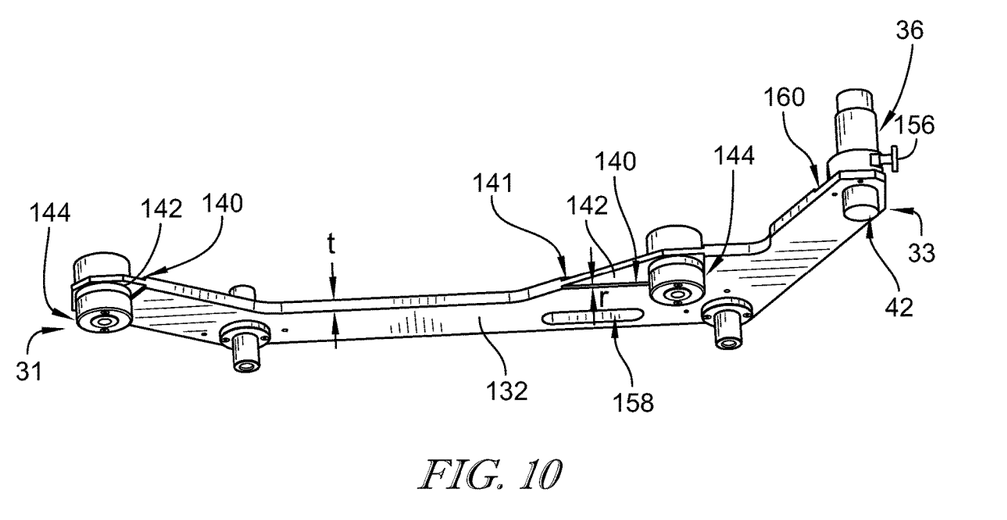
FIG. 10 is another perspective view of the projection tool of FIGS. 8 and 9 viewed radially outward and showing that the pockets include surfaces that engage bushings for securing the projection tool to the mount with precision fit.

As shown in FIG. 10, the body 132 illustratively includes a thickness t. The pockets 140 are illustratively embodied as an depression of the body 132 having depth r such that the body 132 has a reduced thickness in that area. The thickness is illustratively uniform along the body 132 (other than in areas having pockets), although in some embodiments, the thickness t may vary along the body 132. In one non-limiting example, the thickness t may be about 0.5 inches and the depth r may be with a range of about 0.005 inches to about 0.125 inches. In the illustrative embodiment, the attachment points 138 illustratively include pockets 141 formed on an opposite side of the body 132 from the pockets 140 for engaging another portion of the bushing 144, but in some embodiments, the pockets 141 can be omitted and/or have suitable dimensions corresponding with the size of the bushings 144 and/or the arrangement of the projection tool 128 relative to the mount 40. The pockets 140 can reduce the amount and/or complexity of machining required to form the projection tool 128 with precise fit, while retaining sufficient rigidity of the body 132 along the axial direction, and particularly the amount of deflection of the body 132 near the end 33 relative to the axis 15.

Figure 11:
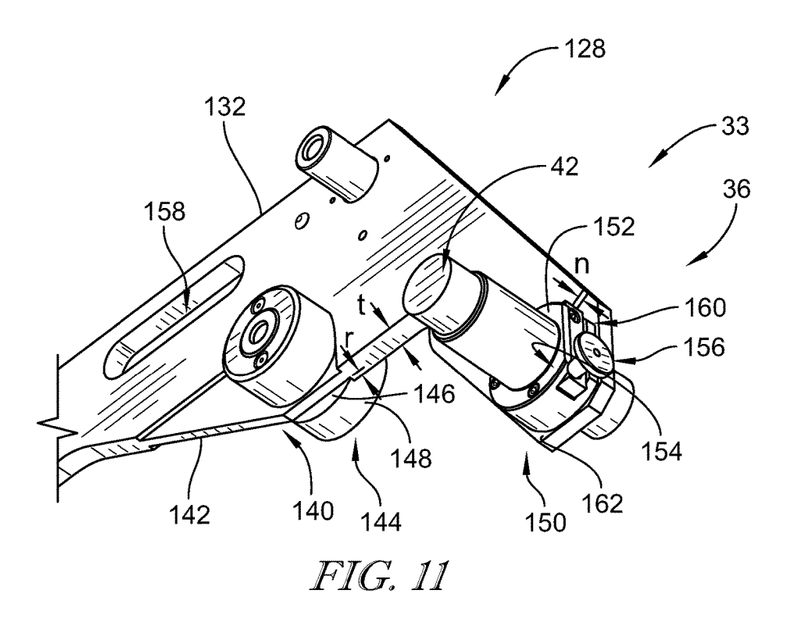
FIG. 11 is a closer perspective view of a portion of the projection tool of FIGS. 8-10 near a projector end showing that the projector is selectively secured by a projector mount.

As shown in FIG. 11, a closer view of a portion of the projection tool 128 near the end 33 is shown. The projection tool 128 illustratively includes a handle 158 for grasping by a user's hand. The handle 158 is illustratively formed as an elongate hole penetrating through the body 132 and positioned radially outside of the attachment points 138.

As shown in FIG. 11, the projection tool 128 illustratively includes a projector mount 150 as a support for the projector 36 configured for selectively securing the projector 36 with the body 132. In the illustrative embodiment, the projector mount 150 includes a collar 152 secured to the body 132 and having a mounting hole 154 extending therethrough for receiving the projector 36. The projector mount 150 illustratively includes a mounting screw 156 threadedly engaged with the collar 152 and selectively penetrating into the mounting hole 154 to engage with the projector 36 to selectively secure the projector 36 in place within the mounting hole 154 with the projection end 42 facing the display tool 26 (forward in the illustrative embodiments).

The projection tool 128 illustratively includes a pocket 160 for mounting the projector 36. In the illustrative embodiment as shown in FIG. 12, the pocket 160 is formed as a depression in the body 132 similar to the pockets 140 of the attachment points 138. The pocket 160 illustratively includes a surface 162 for engagement with the collar 152, the surface 162 having precision fit with the collar 152 to receive the projector 36 for aligning the projection of the marker 30 along the axis 15 for accurate display on the display tool 26. In the illustrative embodiment, the pocket 160 has a depth of about 0.125 inches, but in some embodiments, may have any suitable depth for aligning the projector 36, including but not limited to a depth of about 0.005 inches to about 0.15 inches. Accordingly, the thickness t minus each of the depth r of the pocket 140, minus the depth n of the pocket 160 equals an offset between the mounting surface 142 and the surface 162. The pocket 160 is illustratively arranged on a side of the body 132 opposite the pockets 140, but in some embodiments, may have any suitable arrangement relative to the pockets 140 for positioning the projector 36.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising:
an engine core that extends along a rotating axis, the engine core including a compressor, a combustor, and a turbine;
an engine support structure including a forward frame and an aft frame and defining a core cavity for receiving the engine core, each of the forward frame and the aft frame including a mount for attachment of the engine frame to a base feature, the mounts of the forward frame and the aft frame being arranged in spaced apart relation to each other along a direction of the rotating axis; and
an alignment tool for measuring an amount of angular misalignment between the forward frame and the aft frame, the alignment tool including a projection tool attached to the mount of one of the forward frame or the aft frame and a display tool attached to the mount of the other of the forward frame or the aft frame, the projection tool including a body and a position projector mounted to the body and configured to project a marker onto the display tool to indicate a relative angular position of the projection tool.

2. The gas turbine engine of claim 1, wherein the position projector of the projection tool comprises a laser alignment tool configured to project a visual marker onto the display tool.

3. The gas turbine engine of claim 2, wherein the display tool includes a marker window for receiving the visual marker as projected by the laser alignment tool to indicate the relative angular position of the laser alignment tool.

4. The gas turbine engine of claim 3, wherein the display tool includes a base attached to the mount of the other of the forward frame or the aft frame, a riser that extends radially from the base, and an adjustable slide received by the riser for sliding movement between a first position and a second position to align the marker window with the visual marker.

5. The gas turbine engine of claim 4, wherein the display tool includes an adjustment device including a rod coupled to the adjustable slide and a position wheel that is pinned for rotation to the riser of the display tool by the rod, the position wheel being rotatable about the rod to adjust the position of the adjustable slide.

6. The gas turbine engine of claim 5, wherein the rod includes exterior threads engaged with interior threads of the position wheel, and rotation of the position wheel in a first rotating direction threads the rod through the position wheel in a first direction and rotation of the position wheel in a second rotating direction threads the rod through the position wheel in a second rotating direction.

7. The gas turbine engine of claim 4, wherein the display tool includes an indicator having an indicator window corresponding to an acceptable angular range of misalignment between the forward frame and the aft frame and a position indicator demarking the position of the adjustable slide relative to the indicator window, wherein the indicator window is disposed on one of the riser or the adjustable slide and the position indicator is disposed on the other of the framework or the adjustable slide.

8. The gas turbine engine of claim 1, wherein the projection tool includes at least one mounting point coupled to the mount of the one of the forward frame or the aft frame.

9. The gas turbine engine of claim 1, wherein the display tool comprises at least one receiver configured to receive the marker from the projection tool and to generate a signal indicating the relative angular position of the projection tool based on the marker.

10. The gas turbine engine of claim 1, wherein the mounts of the forward frame and the aft frame are configured to mount the engine to an aircraft.

11. A gas turbine engine comprising:
an engine body including an engine core that extends along a rotating axis and an engine support structure, the engine core including a compressor, a combustor, and a turbine, the engine support structure including a forward frame and an aft frame, each of the forward frame and aft frame including a mount for attachment of the engine support structure to a base feature, the mounts of the forward frame and the aft frame being arranged in spaced apart relation to each other along a direction of the rotating axis;
a projection tool attached to the mount of one of the forward frame or the aft frame, the projection tool including a body extending between opposite ends and having at least one mounting point, the body being configured to mount a position projector configured to project a marker to indicate position; and a display tool including a base attached to the mount of the other of the forward frame or the aft frame, a riser that extends from the base, and an adjustable slide having a marker window for receiving the marker from the projection tool, the adjustable slide being slidably received by the riser for movement between a first position and a second position to determine an angular alignment between the forward frame and the aft frame.

12. The gas turbine engine of claim 11, wherein the display tool includes an adjustment device including a rod coupled to the adjustable slide and a position wheel that is pinned for rotation to a frame of the display tool by the rod, the position wheel being rotatable about the rod to adjust a position of the adjustable slide.

13. The gas turbine engine of claim 12, wherein the rod includes exterior threads engaged with interior threads of the position wheel, and rotation of the position wheel in a first rotating direction threads the rod through the position wheel in a first direction and rotation of the position wheel in a second rotating direction threads the rod through the position wheel in a second direction.

14. The gas turbine engine of claim 11, wherein the projection tool includes a position projector mounted to the body, the position projector being configured to project a marker to indicate a relative angular position of the projection tool.

15. The gas turbine engine of claim 11, wherein the base of the display tool includes a number of holes penetrating therethrough to receive fasteners for connection to the mount of the other of the forward frame or the aft frame.

16. The gas turbine engine of claim 15, wherein the base of the display tool includes a riser hole penetrating therethrough to receive a bottom portion of the riser of the display device.

17. The gas turbine engine of claim 11, wherein the marker window of the display tool comprises at least one receiver configured to receive the marker from the projection tool and to generate a signal indicating a position of the projection tool based on the marker.

18. The gas turbine engine of claim 11, wherein the mounts of the forward frame and aft frame are configured to mount the engine to an aircraft.

* * * * *